US012558991B1

(12) United States Patent
Fletcher et al.

(10) Patent No.: US 12,558,991 B1
(45) Date of Patent: Feb. 24, 2026

(54) POWER PANEL ASSEMBLIES FOR MARINE VESSELS

(71) Applicant: Brunswick Corporation, Mettawa, IL (US)

(72) Inventors: Derek J. Fletcher, Oshkosh, WI (US); Brad E. Taylor, Stillwater, OK (US); David M. Heap, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 127 days.

(21) Appl. No.: 18/422,848

(22) Filed: Jan. 25, 2024

(51) Int. Cl.
| | |
|---|---|
| *B60L 58/12* | (2019.01) |
| *B60L 1/00* | (2006.01) |
| *B60L 1/02* | (2006.01) |
| *B60L 1/14* | (2006.01) |
| *B60L 58/18* | (2019.01) |
| *B63B 79/40* | (2020.01) |
| *H02J 7/00* | (2006.01) |

(52) U.S. Cl.
CPC .............. *B60L 58/12* (2019.02); *B60L 58/18* (2019.02); *B63B 79/40* (2020.01); *B60L 1/003* (2013.01); *B60L 1/02* (2013.01); *B60L 1/14* (2013.01); *B60L 2200/32* (2013.01); *B60L 2240/547* (2013.01); *B60L 2250/16* (2013.01); *H02J 7/0048* (2020.01)

(58) Field of Classification Search
None
See application file for complete search history.

(56) References Cited

U.S. PATENT DOCUMENTS

| | | | |
|---|---|---|---|
| 7,150,664 | B1 | 12/2006 | Uppgard et al. |
| 7,255,616 | B1 | 8/2007 | Caldwell |
| 7,467,595 | B1 | 12/2008 | Lanyi et al. |
| 7,994,795 | B2 | 8/2011 | Drake et al. |
| 9,362,838 | B1 | 6/2016 | Balogh et al. |
| 11,146,029 | B1 | 10/2021 | Shaffer et al. |
| 12,311,851 | B1 * | 5/2025 | Nelson ................. B60R 16/033 |

(Continued)

OTHER PUBLICATIONS

"Easy View 5" accessed from https://www.mastervolt.com/products/masterbus-display/easyview-5/ on Nov. 17, 2023.

(Continued)

*Primary Examiner* — James J Lee
*Assistant Examiner* — Jonathan E Reinert
(74) *Attorney, Agent, or Firm* — Andrus Intellectual Property Law, LLP

(57) ABSTRACT

A power panel assembly for a marine vessel having a first battery, a second battery, and a load. The power panel assembly has a panel configured to be positioned within the marine vessel. A first switch is supported by the panel and operable to selectively turn off the first battery and the second battery together. A second switch is supported by the panel and operable to selectively turn off the first battery independently of the second battery. A third switch is supported by the panel and operable to selectively turn off the second battery independently of the first battery. An indicator is supported by the panel and operatively coupled to be in a first state when the first battery is on and in a second state when the first battery is off to thereby notify an operator whether the first battery is on.

20 Claims, 7 Drawing Sheets

(56) References Cited

U.S. PATENT DOCUMENTS

| | | | | |
|---|---|---|---|---|
| 2008/0315686 A1* | 12/2008 | Elder | ................. | H01M 50/574 |
| | | | | 307/66 |
| 2009/0261838 A1* | 10/2009 | Shull | ............... | G01R 19/16542 |
| | | | | 324/433 |
| 2014/0266793 A1* | 9/2014 | Velado | ................... | B63B 79/10 |
| | | | | 340/870.16 |
| 2021/0300516 A1* | 9/2021 | Hayashi | ................. | B63B 79/40 |
| 2023/0268147 A1* | 8/2023 | DeHorn | ................ | H01H 19/14 |

OTHER PUBLICATIONS

"BMV-712 Smart" accessed from https://www.victronenergy.com/display-and-panels/bmv-712-smart on Nov. 17, 2023.
"Manual Battery Switches e-Series" accessed from https://www.bluesea.com/products/category/11/41/Manual_Battery_Switches/e-Series on Nov. 17, 2023.
"Remote Control Panel" accessed from https://www.bluesea.com/products/1148/Remote_Control_Panel on Nov. 22, 2023.

* cited by examiner

POWER PANEL ASSEMBLIES FOR MARINE VESSELS

FIELD

The present disclosure generally relates to power panel assemblies for marine vessels, and particularly for marine vessels having two or more batteries.

BACKGROUND

The following provide background information and are incorporated by reference in entirety.

U.S. Pat. No. 11,146,029 discloses a plug holder for installing a male plug end of a marine battery charger on a marine vessel includes an outer housing, a removable sleeve, and a backstop. The outer housing has a front end defining a plug opening and a back end defining a back opening, wherein the outer housing is attachable to a vessel hull and configured to hold a male plug end of the marine battery charger within the outer housing such that it is accessible through the plug opening.

U.S. Pat. No. 9,362,838 discloses an electrical power system connectable to an AC base power supply to provide AC base electrical power to a mobile unit. The AC mobile unit electrical power is provided in one embodiment without pass-through of AC electrical power which would otherwise bypass an AC/DC inverter. In one implementation, a marine electrical power system is connectable to an AC shore power supply to provide AC shore electrical power to a docked marine vessel.

U.S. Pat. No. 7,994,795 discloses a current detector and indicator unit that are coupled to a shore power cord for monitoring for corrosion-causing galvanic current on the ground wire of the power cord. A current transducer coupled to the ground wire senses current and provides a signal corresponding to the magnitude of the sensed current to a microcontroller.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a power panel assembly for a marine vessel having a first battery, a second battery, and a load. The power panel assembly has a panel configured to be positioned within the marine vessel. A first switch is supported by the panel and operable to selectively turn off the first battery and the second battery together. A second switch is supported by the panel and operable to selectively turn off the first battery independently of the second battery. A third switch is supported by the panel and operable to selectively turn off the second battery independently of the first battery. An indicator is supported by the panel and operatively coupled to be in a first state when the first battery is on and in a second state when the first battery is off to thereby notify an operator whether the first battery is on.

In certain examples, the first battery and the second battery are electrically coupled to provide power to the load in parallel when the first switch, the second switch, and the third switch are each closed.

In certain examples, the indicator is a light that is on in the first state and off in the second state.

In certain examples, the indicator is a first indicator, further comprising a second indicator supported by the panel, the second indicator being operatively coupled to be in a first state when the second battery is on and in a second state when the second battery is off to thereby notify the operator whether the second battery is on. In further examples, a third indicator is supported by the panel and operatively coupled to be in a first state when the first battery and/or of the second battery is on and in a second state when both the first battery and the second battery are off. In further examples, the first battery and the second battery are power sources configured for powering to the load, further comprising a sensor configured to measure a voltage being provided for powering the load, wherein the third indicator is operatively coupled to be in the first state when any non-zero voltage is measured as being provided by the power sources.

In certain examples, the indicator is a first indicator, further comprising a second indicator supported by the panel and operatively coupled to be in a first state when the first battery and/or of the second battery is on and in a second state when both the first battery and the second battery are off.

In certain examples, a controller is configured to receive an input relating to whether the first battery is on, wherein the indicator is operatively coupled to be controlled by the controller based on the input. In further examples, the controller is configured to receive the input via a CAN bus. In further examples, the first battery has a battery management system (BMS) associated therewith, and wherein the controller is operatively coupled to the first switch and configured to control the BMS of the first battery based thereon. In further examples, the indicator is a first indicator, further comprising a second indicator supported by the panel, the second indicator being configured to display a state of charge of the first battery. In further examples, the first indicator and the second indicator are spaced apart from each other and are independently operable by the controller. In further examples, the controller is configured to display the state of charge of the first battery when the first switch and/or the second switch is open. In further examples, the controller is configured to determine whether the first battery is being charged and to cause the second indicator to indicate when the first battery is being charged. In further examples, a touchscreen device is supported by the panel, wherein at least one of the first switch, the second switch, and the third switch is operated via the touchscreen device.

Another aspect according to the present disclosure generally relates to a power panel assembly for a marine vessel having a first battery, a second battery, and a load. The power panel assembly has a panel configured to be positioned within the marine vessel, A first switch is supported by the panel and operable to selectively turn off the first battery and the second battery together. A second switch is supported by the panel and operable to selectively turn off the first battery independently of the second battery. A third is switch supported by the panel and operable to selectively turn off the second battery independently of the first battery. An indicator is supported by the panel and operatively coupled to be in a first state when the first battery and/or the second battery is on, and in a second state both the first battery and the second battery are off to notify an operator that at least one of the first battery and the second battery is on.

In certain examples, the indicator is operable independently of the first switch, the second switch, and the third switch.

In certain examples, a controller is configured to receive an input relating to whether the first battery is on, wherein the indicator is operatively coupled to be controlled by the controller based on the input.

Another aspect according to the present disclosure generally relates to a power panel assembly for a marine vessel having a first battery, a second battery, and a load. The power panel assembly has a panel configured to be positioned within the marine vessel. A first switch is supported by the panel and configured to be electrically coupled to the first battery and the second battery. A second switch and a third switch are each supported by the panel and each electrically coupled between the first switch and the load to selectively control energy flow therebetween, wherein the first switch selectively controls energy flow from the first battery to the second switch and from the second battery to the third switch. A first indicator is supported by the panel and operatively coupled to be in a first state when the first battery is electrically connected to the load and in a second state when electrically disconnected from the load. A second indicator is supported by the panel and operatively coupled to be in a first state when the second battery is electrically connected to the load and in a second state when electrically disconnected from the load. A third indicator is supported by the panel and operatively coupled to be in a first state when the first battery and/or the second battery is electrically connected to the load and in a second state when both the first battery and the second battery are electrically disconnected from the load, wherein the third indicator is operable independently operable independently of the second switch and the third switch so as to notify an operator whether at least one of the first battery and/or the second battery is electrically connected to the load.

In certain examples, at least one of the first switch, the second switch, and the third switch is electrically connected to the first battery and the second battery to control the energy flow therefrom without a CAN bus.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

Figure 1:
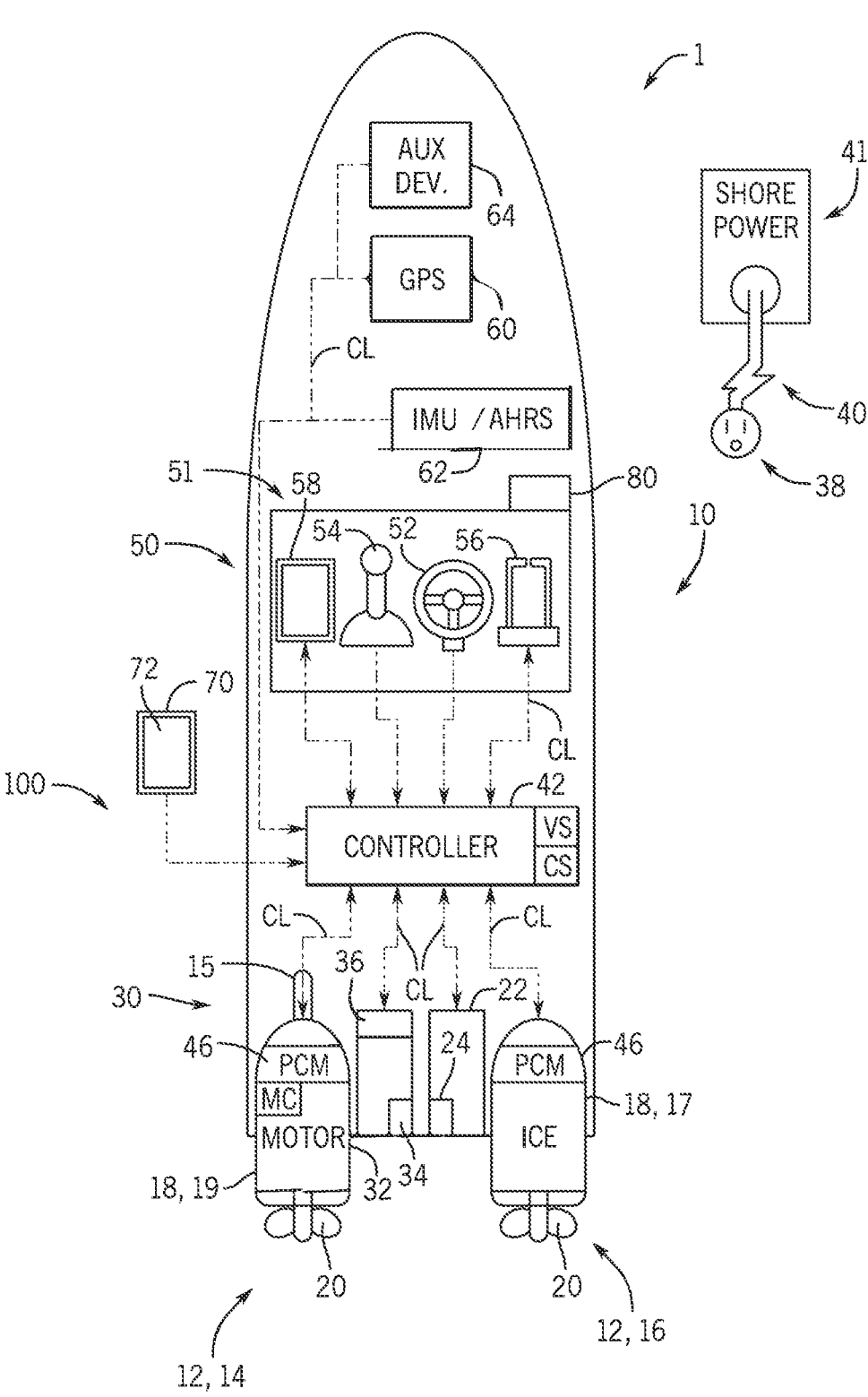
FIG. 1 is a top view of a marine vessel incorporating a power panel system according to the present disclosure.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

The present inventors have recognized that there are unique challenges to managing power for a marine vessel, some of which have not previously been identified and addressed. Marine vessels commonly have multiple power sources for providing electrical power for the marine vessel, for example energy storage devices such as a battery bank of rechargeable batteries, fuel cells, capacitors, and/or the like, as well as power supplies such as battery chargers and/or incoming shore power lines. For the sake of brevity, the present disclosure principally refers to batteries as the power sources. These power sources may be used for powering a wide variety of devices both when the marine vessel is underway or is docked, such as for communication radios, GPS, display devices, bilges, lighting, refrigerators, HVAC systems, electric or hybrid marine drives, electromechanical steering and/or trim, and the like (also referred to as the "house load" or the "load"). As marine vessels advance over time, including the integration of electric powered marine drives, the energy storage capacity has also increased to meet these additional power demands. This capacity includes higher voltages and/or amounts of stored energy (e.g., amp-hours).

The power systems of some marine vessels include an external power connection through which power may be received from an external power source, such as a shore power station at a marina. The external power connection may be a conventional connector configured to electrically connect with a power-carrying cable having a corresponding plug, whereby the cable is electrically connected at the other end to the external power source. It should be recognized that the terms "connector" and "plug" may be used interchangeably unless otherwise noted. By way of example, the external power connector may be a male or female straight blade configuration rated at 10A or 12A and 120V as is prevalent in the United States, locking connectors of varying amperages (e.g., 20A, 30A, 50A and 120V or 250V), or other types of known power connectors. The external power connection is positioned in a location that is convenient from outside the marine vessel. For example, the external power connection may be positioned at or near the bow, at or near the stern (e.g., at the transom), or on a side of the hull (e.g., on the gunwale) to be easily plugged into from a dock.

The power from the external power source may be supplied to house loads that are hardwired or themselves plugged into connectors or receptacles on the marine vessel. The power from the external power source may be converted between AC and DC power, stepped up or down to different voltages, filtered, or otherwise conditioned in a conventional manner. By way of example, the external power source may be electrically coupled to outlets within the marine vessel that supply power at 120 VAC, to 12 VDC accessory outlets, and/or to USB ports operating at 5 VDC. These outlets and ports may also be powered by the batteries onboard the marine vessel, particularly when disconnected from the external power source. Power from the external power source can also be used to power hardwired components such as one or more chargers that operate to charge the batteries on the marine vessel.

Some marine vessels also include a mechanism for turning off the batteries such that the batteries no longer provide energy to the power system of the marine vessel. These may be local switches positioned on or with each battery, one or more switches in different compartments in which one or more batteries are stored, and/or one or more switches positioned near the helm. Each battery switch is referred to as being in the on-state (or "closed") when the battery is configured to provide energy to the marine vessel, switchable to an off-state (or "open") in which the battery is electrically disconnected to be prevented from providing the energy to the marine vessel. Each battery may be outfitted with its own separate battery switch and thus independently controlled. In the presently disclosed embodiments, it should be recognized that the battery switches may be selectively operable to close a circuit between a battery and the load, and/or selectively to control a battery management system (BMS) associated with one or more batteries to change whether power is provided from the one or more batteries. Each of these control configurations may be referred to as turning off, disabling, or disconnecting the corresponding battery as each has the effect of the corresponding battery no longer providing power to the load.

The present inventors have identified a number of circumstances in which it is beneficial to disable all power sources for the marine vessel, such to service the power system or the marine vessel more generally, or other occasions in which it is beneficial to not have the batteries provide power to the power system. Another such occasion in which it is beneficial to disable all power sources (e.g., turn off all batteries) is when a first responder boards a marine vessel in the event of an emergency. Locating the various battery switches can be troublesome and an operator may not find them all. Additionally, the present inventors have identified a further problem in that the batteries are not the only source of power for the power system. As discussed above, power is also receivable from an external power source. Therefore, even if the batteries are successfully disconnected via one or more battery switches, the power system may still be live via a connection to the external power source. Moreover, the existence of a battery switch (and the knowledge of having turned it off) may lead to the false belief that the entire power system is de-energized, whereas a battery charger or other devices receiving power from the external power source are uncontrolled by the battery switch and thus remain powered.

While it is possible for the operator, a first responder, or the like (all referred to generally as "operators" or "users") to also unplug the external power connection in addition to turning off all battery switches, there is no known mechanism for informing these users whether these two sources of power are still providing power to the marine vessel, nor to remind, guide, or assist the users in ensuring that all sources have been disabled. It should be recognized that whether a source of power is providing power to the marine vessel is distinct from a position of its on/off switch, which even when positioned off may not result in preventing the power from being provided to the marine vessel (e.g., due to failure). Additionally, the present inventors have recognized that battery switches known in the art are not positioned in close proximity to each other, nor to the external power connection, and thus there is no visual cue to the person that both sources require disabling.

In other examples of devices known in the art, a display device may show the current voltage within the power system but does not provide controls for the power sources thereof. Likewise, battery switches located in the bilge are inconvenient and do not provide any information as to the current voltage within the power system. As such, an operator cannot both control and monitor the status of the power system at the same time. This may be particularly problematic for first responders, who are not familiar with the particular marine vessel or the specific protocols for disabling all its sources of power, nor the specific mechanisms for confirming that all sources of power have indeed been disabled.

Accordingly, the present inventor has developed the presently disclosed systems and methods for simplifying and in certain cases automating processes for disabling power within a marine vessel's power system, and/or indicating the status of the power systems or components thereof.

FIG. 1 depicts an example of a power system 10 for a marine vessel 1 according to the present disclosure. As discussed further below, the power system 10 may include batteries or other power storage devices, control devices, charging devices, indication devices (lights, speakers), various connections, inverters, conditioning devices (e.g., filters), and the like. In general, these components within the power system 10 provide for receiving, controlling, storing, detecting and/or supplying power, as well as determining and communicating power related statuses for the marine vessel.

The marine vessel is configured to move within a body of water in a direction instructed by an operator via a steering control system, or by a guidance system configured to automatically control steering of the marine vessel to steer the vessel toward a predetermined location or global position. The marine vessel 1 may be steered in a conventional manner, such as by controlling a marine drive or a rudder via a steering actuator. Additional information regarding exemplary steering actuators is provided in U.S. Pat. Nos. 7,150, 664; 7,255,616; and 7,467,595, which are incorporated by reference herein.

The marine vessel 1 of FIG. 1 has a propulsion system with at least one marine drive 12 configured to propel the marine vessel 1 through the water. While the propulsion system is generally described herein as using motors or engines as powerheads to generate thrust in the water, the present disclosure is also applicable for marine vessels that are moved in the water via sails, oars, pedals, and/or other mechanisms. For demonstration purposes, the present marine vessel 1 is shown to have two different marine devices 12, specifically an electric marine drive 14 steerable by a tiller handle 15 with a throttle grip, and a gasoline powered marine drive 16 (e.g., steerable by conventional steering actuators). While the marine drives 12 are shown as outboard motors, these could instead be inboard motors, stern drives, pod drives, and/or jet drives. Each marine drive 12 includes a powerhead 18. The powerheads 18 may be internal combustion engines (ICE) 17 (e.g., gasoline or diesel engines, gasoline for the gasoline powered marine drive 16), electric motors 19 (e.g., for the electric marine drive 14), and/or a hybrid thereof.

Examples of powerheads 18 for electric marine drives include, for example, a brushless DC motor, a DC brushed motor, an AC brushless motor, a direct drive, a permanent magnet synchronous motor, an induction motor, or any other device that converts electric power to rotational motion. In certain embodiments, the powerheads 18 include a rotor and a stator in a known configuration. Each electric motor 19 may be associated with its own motor controller MC configured to control power to the electric motor, such as to the stator winding thereof. The motor controller MC is configured to control the function and output of the electric motor 19, such as controlling the torque outputted by the motor, the rotational speed of the electric motor 19, as well as the input current, voltage, and power supplied to and utilized by the electric motor 19. In one arrangement, the motor controller MC controls the current delivered to the stator windings via leads connected to the electric motor 19, which input electrical energy to the electric motor to induce and control rotation of the rotor.

Each powerhead 18 is operatively connected in a torque-transmitting relationship that rotates a propeller 20 to generate thrust in the water. As will be known to one of ordinary skill in the art, the propeller 20 may include one or more propellers, impellers, or other propulsor devices and that the term "propeller" may be used to refer to all such devices.

The marine drives 12 are connected so as to receive energy from one or more energy sources. In the case of a gasoline powered marine drive 16, the energy is gasoline and the energy source is a fuel tank 22 fluidly connected to the ICE 17 in a conventional manner. A fuel level sensor 24 is configured to measure the amount of fuel remaining in the fuel tank 22 in a conventional manner (e.g., a Hall effect sensor that measures a position of a float within the fuel tank 22).

In the case of an electric marine drive 14, the energy is electrical power, and the energy source is a power storage system 30. The power storage system 30 stores electrical energy for powering the electric motor 19 and/or other electrical devices associated with the marine vessel, such as HVAC systems, water pumps, and the like. Various power storage devices and systems are known in the relevant art. The power storage system 30 may be a battery system including one or more batteries or banks of batteries 32. For example, the power storage system 30 may include one or more lithium-ion (LI) battery systems, each battery comprised of multiple battery cells. In other embodiments, the power storage system 30 may include one or more lead-acid batteries, fuel cells, flow batteries, ultracapacitors, and/or other devices capable of storing and outputting electric energy. By way of example, this may include marine batteries in the group sizes BCI 24, 27, 31, and/or 34. For simplicity, a single battery bank 32 is shown in FIG. 1, but the marine vessel 1 may have two or more battery banks or one or more batteries each.

The power system 10 of FIG. 1 further includes a battery management system (BMS) 34 configured to monitor and/or control aspects of the power storage system 30. The BMS 34 may further be configured to receive information from current, voltage, and/or other sensors within the power storage system 30, such as to receive information about the voltage, current, and temperature of each battery cell or group of battery cells within the power storage system 30. For example, the BMS 34 may receive inputs from one or more sensors within the power storage system 30, such as one or more voltage, current, and temperature sensors within a housing for the power storage system 30. As described above, voltage sensors VS may be configured to sense voltage within the battery (such as cell voltage sensors configured to sense the voltage of individual cells or groups of cells in a LI battery) and one or more temperature sensors may be configured to sense a temperature within a housing of the power storage system 30 where one or more batteries or other storage elements are located. The BMS 34 or other controller in the system is configured to calculate a charge level, such as a state of charge, a voltage, whether any of the batteries are being charged, or other electrical measures of the power storage system 30.

While FIG. 1 shows the power system 10 having a single BMS 34, it should be recognized that other configurations are also contemplated, including systems with no BMSs, a separate BMS for each battery cells, each battery, and/or each battery bank, or configurations in which one or more BMSs are shared across battery cells, batteries, and/or each battery banks.

The batteries within the battery banks 32 are configured to be charged via one or more chargers 36 that receive power from an external power connection 38 that is electrically coupled to the power system 10. The external power connection 38 may vary in form but is generally configured for being electrically coupled to an external power source such as a shore power station 41, for example via a cable 40 having conventional flat blade electrical prongs. By way of example, the external power connection 38 may be a NMEA L5-30-Standard 30A shore power receptacle. In certain examples, the charger may provide hundreds or even thousands of watts depending on the storage capacity of the power storage system. While the present disclosure generally refers to the external power connection as being a conventional source of shore power, this could also or alternatively be solar panels, wind vanes, water wheels, and/or other sources of power.

With continued reference to FIG. 1, the marine vessel 1 includes a control system 100 that controls the power system 10 and other systems and devices of the marine vessel. The control system 100 may include a plurality of control devices described herein. For example, the control system 100 includes a central controller 42, the one or more battery controllers or battery management systems BMS 34, a propulsion control module (PCM) 46, and one or more motor controllers MC, trim controllers, steering controllers, etc. Other controllers are also contemplated, such as a charging controller within the charger 36. The different controllers 34, 42, 46, and MC and may be communicatively connected via communication links CL, which may be as a communication bus such as a CAN bus or a LIN bus, or by single dedicated communication links between components. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected. In certain embodiments, one or more of the controller 34, 42, and 46 are positioned within a marine drive (e.g., an electric marine drive).

Each controller may comprise a processor and a storage device, or memory, configured to store software and/or data utilized for controlling and or tracking operation of the power system 10 and/or the electric propulsion system. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 100 and peripheral devices.

In certain embodiments, various sensing devices such as those described above for measuring voltage, current, state of charge, and the like may be configured to communicate with a local controller, such as the motor controller MC, a propulsion control module PCM 46, or BMS 34. In other embodiments, the various sensing devices may communicate with the central controller 42, which may permit eliminating one or more local controllers. In the example of FIG. 1, the controller 42 communicates with the BMS 34 to receive voltages, currents, state of charge, and other measurements therefrom, as well as to control the operation of the corresponding battery. In the embodiment of FIG. 1, a voltage sensor VS and a current sensor CS are provided within the power system 10 and in communication with the controller 42 to provide measurements of the current voltage within the power system 10 (e.g., the voltage potential available for powering the load), and the current flowing to the load, respectively. Other sensors may also be provided in communication with the controller 42 in a conventional manner.

With continued reference to FIG. 1, additional components are also provided in communication with the control system 100, each of which may function as an input thereto and/or output thereof. In the example shown, the controller 42 also receives input from and/or communicates with one or more user interface devices within a user interface system 50 at the helm 51 of the marine vessel 1 via the communication links CL. Communication between the user interface system 50 at the helm 51 and the controller 42 may be provided via the same communication link as utilized for communication between the controllers 34, 46, MC, or may be a separate communication link. The user interface devices 50 in the exemplary embodiment include a steering wheel 52, a joystick 54, throttle levers 56, and a display device 58.

The steering wheel 52 and joystick 54 may be configured to receive user inputs in a conventional manner, which subsequently may communicate with the controller 42 to effectuate steering control over the marine vessel 1, such as by steering one or more marine drives 12, which is well-known and typically referred to as steer-by-wire arrangements. Other steer arrangements, such as steering cable systems arrangements, are well-known in the art and could alternatively be implemented.

Likewise, the throttle levers 56 may be configured to receive user inputs in a conventional manner (also referred to as receiving a requested speed or a demand request), including both a magnitude and a direction for generating thrust, which may be subsequently communicated with the controller 42. In particular, the throttle levers 56 may communicate with the controller 42 to effectuate control of the output of the powerheads 18 of the one or more marine drives 12, which is well-known and typically referred to as a throttle-by-wire arrangement.

The display device 58 is configured to display information for the user, as well as to receive input commands relating to steering, thrust, and/or other functions of the marine vessel and/or marine drive. This includes the programming of destinations and waypoints for autopiloting. In particular, the display device 58 may be a multi-functional display device permitting touch-screen inputs from the user. It should be recognized that other input devices may also be provided, such as keyboards, trackpads, roller balls, and the like. In various embodiments, the display device 58 may be, for example, part of an onboard management system, such as the Vessel View™ by Mercury Marine of Fond du Lac, Wisconsin.

The onboard management system may also or alternatively be controlled through an external device 70 that wirelessly communicates with the controller 42, such as a tablet or smartphone communicating via wireless protocols known in the art (e.g., Wi-Fi or Bluetooth®). The external device 70 may have a processor, storage device, and an input/output (I/O) system in the same manner as other controllers discussed above. The processor may be configured to execute an application stored in the storage device that enables the user to receive information from the controller 42 relating to the marine drives 12 and the marine vessel 1 more generally, to input a destination for propelling the marine vessel, and to provide input commands to the controller 42 for controlling the marine drives 12 and the marine vessel 1 more generally. By way of example, the external device 70 may be configured to operate an application such as the "Mercury Marine" App or the Vessel View™ Mobile App each provided by Mercury Marine of Fond du Lac, Wisconsin. In each case, the applications allow the user to receive information and to provide input commands via a user interface 72 of the external device 70, such as via a touchscreen. In this manner, the external device 70 may also constitute a controller within the control system 100.

Other components may also communicate with the controller 42, such as a GPS system 60 configured to determine a current global position of the vessel, track vessel position over time, and/or determine vessel speed and direction of travel and to provide this information to the controller 42. Alternatively, or additionally, vessel speed may be measured by a speed-over-water sensor such as a pitot tube or a paddle wheel and such information may be provided to the controller 42. This communication may again be provided via CAN bus, LIN bus, or single dedicated communication links).

The marine vessel 1 may also include an inertial measurement unit (IMU) or an attitude and heading reference system (AHRS) (collectively shown as the IMU/AHRS 62). An IMU has a solid state, rate gyro electronic compass that indicates the vessel heading and solid-state accelerometers and angular rate sensors that sense the vessel's attitude and rate of turn. An AHRS provides 3D orientation of the marine vessel 1 by integrating gyroscopic measurements, accelerometer data, and magnetometer data. The IMU/AHRS 62 could be GPS-enabled, in which case a separate GPS system 60 would not be required. The IMU/AHRS 62 may communicate with the controller 42 in a similar manner to the GPS system 60.

In addition to the electric marine drive 14, the GPS 60, the IMU/AHRS 62, and other electrical devices are also powered by the power system 10. In particular, the power system 10 may further be configured to power auxiliary devices 64 on the marine vessel 1 such as a bilge pump, a cabin light, a stereo system or other entertainment devices on the vessel, a water heater, a refrigerator, an air conditioner or other climate/comfort control devices on the vessel, communication systems, navigation systems, or the like. These devices may be powered from batteries (which are in turn powered by a charger), or directly powered by an external power source.

Figure 2:
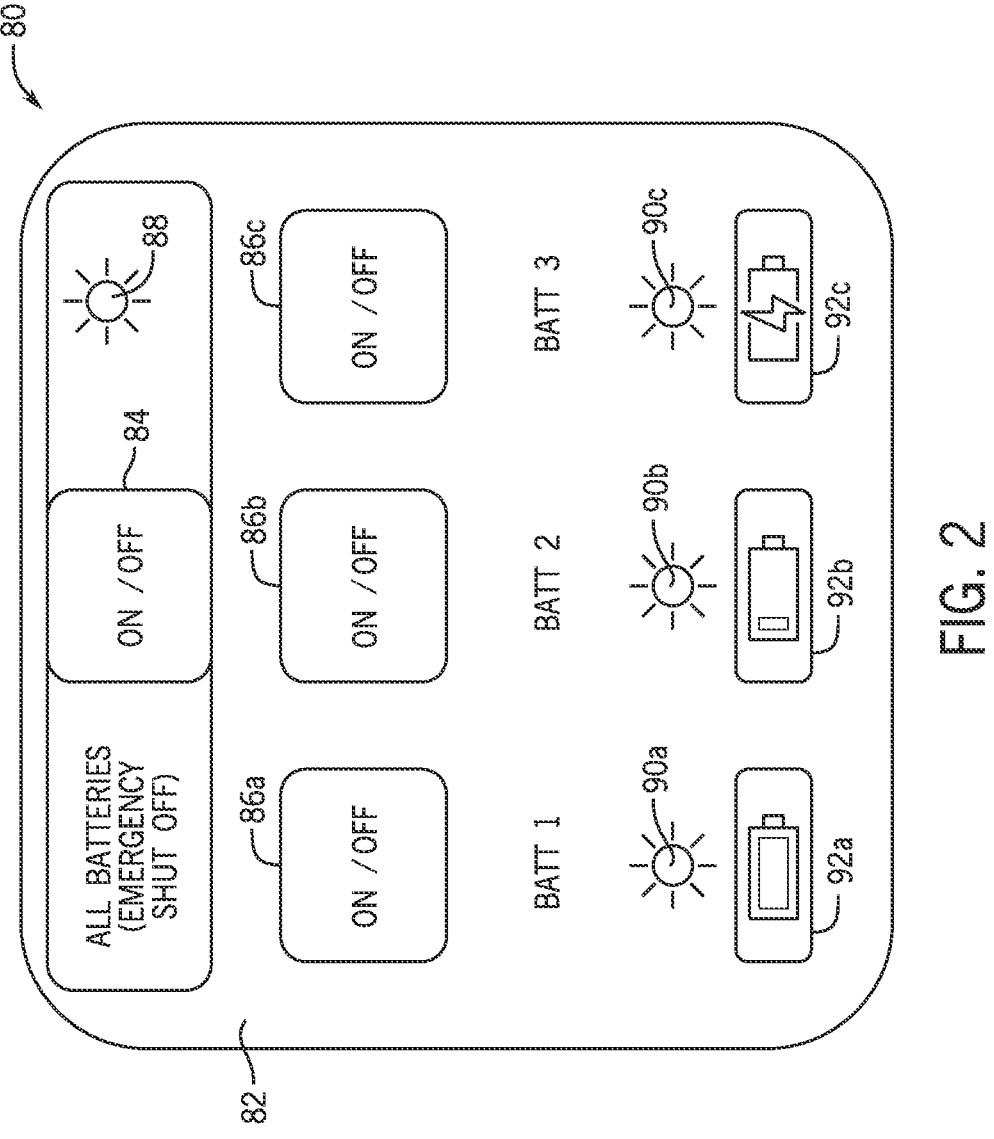
FIG. 2 is a front view of a power panel assembly according to the present disclosure.

As discussed above, the present inventors have recognized an unmet need for a solution that allows for easier turning on and off power sources such as batteries, as well as providing feedback regarding the status of these power sources in a manner accessible to the operator at the same time. FIG. 2 depicts one embodiment of a power panel assembly 80 according to the present disclosure developed to address the problems identified above. The power panel assembly 80 is configured for use with a marine vessel having at least one power source and a load, which in the present example is configured for a marine vessel having three batteries. The power panel assembly 80 has a panel 82 that is configured to be positioned within the marine vessel, for example to be coupled at the helm 51 (FIG. 1) in a manner known in the art), such as via fasteners. By way of example, the panel 82 may made of plastic, fiberglass, and/or metal.

The power panel assembly 80 of FIG. 2 includes a number of switches 84 and 86a, 86b, and 86c that are each supported by the panel 82. The panel 82 may be a single rigid structure as shown, or may be subdivided into multiple sections to be mounted separately but in generally close proximity to each other within the marine vessel. Each of the switches 84 and 86a-c has both an on-state and an off-state, which in certain examples corresponds to a physical change in position (e.g., toggle switches, push button switches, rotary switches), and in other examples corresponds to a virtual change in position (e.g., for a "soft" button on a display such as a touchscreen display). The switches may be electrically coupled to the marine vessel in different manners, which are discussed further below. From a functional perspective, the switch 86a is operable to selectively turn off a first battery, the switch 86b is operable to selectively turn off a second battery, and the switch 86c is operable to selectively turn off a third battery each within the power system 10. Each of the switches 86a-c is operable independently of the others. In other words, the on/off state of each battery can be independently controlled via the switches 86a-c. This may be via physical electrical connections being provided through a given switch between the corresponding battery and the load. In other configurations, operation of a given switch controls the on/off state of the battery by providing inputs to the battery management system corresponding thereto. It should be recognized that for brevity the present disclosure refers to the switches are described as being configured to turn batteries or other power sources off but are also operable to selectively turn these power sources on.

Unlike power systems presently known in the art, the power panel assembly 80 provides that the different switches 86a-86c are provided in close proximity to each other, rather than being in various places throughout the marine vessel. As discussed above, a switch for controlling the on/off state of a given battery may be in a different place than the switch for another battery, for example being under different seats, one at the bow and another at the stern, and/or one in a bilge. This allows the operator to immediately observe the presence of the switches for all batteries at the same time, as well as the position of each. By way of example, the switches may be positioned on the panel 82 closely enough to easily view their statuses and/or being within reach at the same time (e.g., 10.0 cm, 5.0 cm, 2.5 cm, 1.0 cm, 0.5 cm, or other distances apart).

With continued reference to FIG. 2, the present inventors have recognized that further benefits can be provided by including the switch 84 on the panel 82, also in proximity to the other switches 86a-86c as discussed above. The switch 84 is operable to selectively turn off all of the batteries together. In this manner, the first battery can be turned off (also referred to as being disabled or disconnected) by turning off the switch 84 and/or turning off the switch 86a, and so on for the other batteries. Further, while turning off the switch 86a would not turn off the second battery, turning off the switch 84 would turn off the second battery. As with the switches 86a-86c, and as further described below, the switch 84 may simultaneously alter the physical electrical connections between each of the batteries and the load, or may communicate simultaneously with all of the battery management systems corresponding to these batteries to cause them to stop providing power to the load.

The present inventors have recognized that the switch 84 provides an intuitive mechanism for quickly and unambiguously disabling all power sources on the marine vessel. This may be particularly helpful for first responders for service personnel, which in certain embodiments can be clearly labeled for emergency shutoff via a single operation.

The present inventors have further recognized that providing a solution for easily switch each battery to the off position does not necessarily guarantee that those batteries is indeed no longer providing power to the load. Moreover, the batteries with switches may not be the only power sources in the marine vessel. For example, even where all batteries are turned off, a battery charger may be operating and thus providing high voltage to the load.

With continued reference to FIG. 2, power panel assembly 80 further includes an indicators 88 and 90a, 90b, and 90c that are supported by the panel 82, which may be coupled to the panel 82 in a conventional manner. By way of example, the indicators 88 and 90a-90c may be lights such as LEDs or a portion of a display device (an LCD or LED monitor). The indicators 88 and 90a-90c may be electrically coupled to the marine vessel in different manners, which are discussed further below. Indicators 88 may also be duplicated, e.g., in parallel, as a form of redundancy in case one device fails. From a functional perspective, the indicator 88 may be configured to be in a first state (e.g., on or illuminated) when the switch 84 is in the on position, and in a second state (e.g., off or non-illuminated) when the switch 84 is in the off position. In this manner, the indicator 88 provides feedback to the user as to the position of the switch 84. In another embodiment, the indicator 88 is configured to be in a first state when the switch 84 and at least one of switches 86a-86c is in the on position, and in a second state when none of the switches 86a-86c is in the on position.

The indicators 90a-90c may be configured to be in a first state (e.g., on or illuminated) when the switches 86a-86c are in the on positions, respectively, and likewise in a second state (e.g., off or non-illuminated) when the switches 86a-86c are in the off positions, respectively. In certain embodiments, the indicators are powered by each of the corresponding batteries themselves. In other embodiments, the indicators are provided with dedicated power from the power system 10 generally, rather than being powered by the specific battery. In this manner, the indicators 88 and 90a-90c are operable to notify the operator of the positions of the different switches 84 and 86a-86c, increasing awareness and assisting in the process of ensuring that all switches are in the desired positions.

In other embodiments, one or more of the indicators 88 and 90a-90c are configured to not merely indicate the position of the switches 84 and 86a-86c, respectively, but the actual power statuses of the underlying power sources associated therewith. For example, the indicator 90a may be electrically coupled to the battery management system BMS of the first battery so as to be on when the first battery is on and off when the first battery is off. The same configurations may be provided for the indicators 90b-90c for the second and third batteries. Similarly, the indicator 88 may be electrically coupled to the BMSs of all batteries such that if any battery is on, the indicator 88 is one.

In another embodiment, the indicator 88 is configured to be on any time the voltage within the power system 10 being provided for powering the load (e.g., from any batteries and/or other power sources that are on) is non-zero or in certain embodiments exceeds a threshold. The threshold may be stored in memory and may be selected to correspond to a minimum phantom voltage anticipated to potentially remain in the system when all power sources are off, or a voltage under which the operator may essentially ignore when servicing the power system 10 and the like (e.g., below 50V, below 40V, below 24V, below 12V, below 5V, etc., all in DC power). In certain embodiments, different indicators are active depending on different threshold conditions being met (e.g., one on for >12V, a second one on for >24V, and a third one on for >50V). In certain examples, a non-zero threshold is advantageous to account for high voltage capacitors bleeding down slowly after turning off all power sources. The voltage may be provided by the individual BMSs (e.g., a summation of all BMSs), measured by the voltage sensor VS, or other sources.

The present inventors have recognized by controlling the indicator 88 as a function of the voltage, current, or another measure of power present for powering the load, the operator is quickly and easily notified as to whether there is any source of power still live in the power system 10. In this manner, even if the operator has successfully disabled all batteries (e.g., but turning off the switch 84 and/or the switches 86a-86c), this will inform the operator that a charger, shore power, or another source remains live and thus must be disabled.

In certain embodiments, the switch 84 is not only electrically coupled within the power system 10 to turn off all batteries, but all sources of power. In other words, the switch 84 may be connected to also disconnect power from chargers, shore power, and the like.

The power panel assembly 80 of FIG. 2 further advantageously provides for additional indicators that provide further, centralized information regarding the batteries provided throughout the marine vessel. In particular, the panel 82 further supports indicators 92a-92c that are configured to show the state of charge of the three batteries in the exemplified power system. The indicators 92a-92c maybe a series of LEDs or other lights (e.g., that light in sequence to indicate a percentage of full charge), a display device that displays a graphic (as shown), an alphanumeric display that displays a numeric percentage of full charge, and/or other conventional mechanisms for showing state of charge for a battery. The indicators 92a-92c may also be configured to display whether the battery is currently being charged, indicated here as a lighting bolt, which may be in addition to or in place of showing the state of charge levels. In the examples shown, the indicator 92a shows a state of charge of 100% for the first battery, the indicator 92b shows a state of charge of 12.5% for the second battery, and the indicator 92c shows that the third battery is being charged. Other configurations for conveying the state of charge and/or charge status are also contemplated.

In this manner, the indicators 92a-92c again provide important information to the operator that isn't otherwise available, and in a convenient and centralized location. The indicators 92a-92c may also provide further insights as to the states of the power sources in the power system. For example, in certain embodiments the indicators 92a-92c are configured to not display anything when the corresponding batteries are turned off, providing further confirmation that these batteries have been disabled. In other embodiments, the indicators 92a-92c remain on even when the corresponding batteries are disabled, which in this case may be powered by alternative power sources in the power system more generally. The indicators 92a-92c also provide a mechanism for showing that a charger is active even if the battery is turned off, specifically by the lighting bolt or other indicator showing. This provides another mechanism for the operator to recognized that the entire power system may not be disabled simply because the batteries are all turned off, providing the advantages discussed above.

It should be recognized that the different functional configurations of the various indicators may be provided in different combinations than those expressly discussed above. For example, for configurations in which the indicators 92a-92c can show a charging status, the indicator 88 may need to be configured to illuminate when the charger is operating. In other cases, it may be advantageous to have the charging state indicated both by the indicators 92a-92c and 88 for further redundancy.

It should further be recognized that the different indicators described above need not be limited to operating simply in on or off states. For example, indicators may be operable in a first state in which it is illuminated in one color and a second state in which it is illuminated in another color (e.g., green when the battery is on, red when the battery is off). Similarly, different colors can be used to indicate a charge state (red below 25%, orange between 25 and 50%, yellow from 50-75%, and green above 75%). In addition, or in the alternative, the brightness or duty cycle of the indicators may vary depending on the information to be communicated. For example, solid green may indicate that a battery is on, whereas flashing green indicates that the battery is on and charging (or in other cases, charging irrespective on being on or off).

In certain embodiments, one or more of the switches 84, 86a-86c and/or one or more of the indicators 88, 90a-90c, 92a-92c is provide on a display device such as touchscreen display. In the case of the one or more switches, the switches may be operated by touching the corresponding graphics on the touch screen, which may appear in the same manner as physical switches (each being as shown in FIG. 2). The indicators may be graphics that resemble lights, text messages, symbols, or other indicia to convey the messages described above. For example, the indicator 88 may be a graphic of an illuminated LED, a message stating "power system live" or "charging". The indicators 92a-92c may also or alternatively be configured to display a message of "charging", but in this case on a battery level. By way of example, indicators 90a-90c may be similar to 88, or may provide messages such as "Battery 2 Disabled" or "Battery 3 Comm. Failure" to provide further insights to the operator, such as issues in which a switch (e.g., 86c) is not providing the desired response for the battery.

Figure 3:
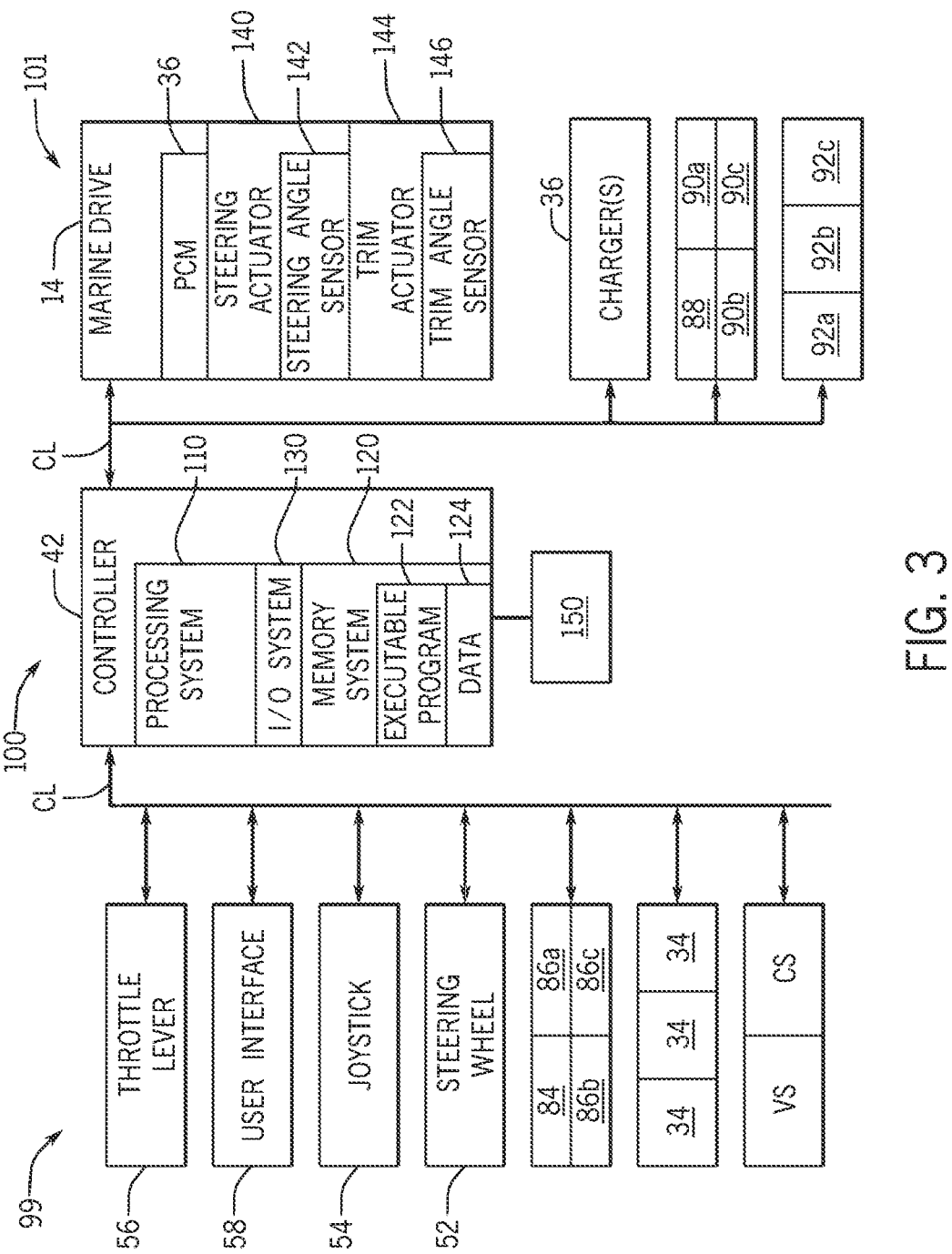
FIG. 3 is a schematic view of a control system for a power panel assembly such as shown in FIG. 2.

With reference to FIG. 3, additional information is now provided for an example of the control system 100 such as may be incorporated within the marine vessel 1 of FIG. 1. Certain examples of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 100 communicates with each of the one or more components of the power system 10 via a communication link CL, which can be any wired or wireless link. The control system 100 is capable of receiving information and/or controlling one or more operational characteristics of the and its various sub-systems by sending and receiving control signals via the communication links CL. In one example, the communication link CL is a controller area network (CAN) bus; however, other types of links could be used. It will be recognized that the extent of connections and the communication links CL may in fact be one or more shared connections, or links, among some or all of the components in the power system 10. Moreover, the communication link CL lines are meant only to demonstrate that the various control elements are capable of communicating with one another, and do not represent actual wiring connections between the various elements, nor do they represent the only paths of communication between the elements. Additionally, the power system 10 may incorporate various types of communication devices and systems, and thus the illustrated communication links CL may in fact represent various different types of wireless and/or wired data communication systems.

The control system 100 may be a computing system that includes a processing system 110, memory system 120, and input/output (I/O) system 130 for communicating with other devices, such as input devices 99 and output devices 101. The processing system 110 loads and executes an executable program 122 from the memory system 120, accesses data 124 stored within the memory system 120, and directs the power system 10, and the marine vessel 1 generally to operate as described in further detail below.

The processing system 110 may be implemented as a single microprocessor or other circuitry or be distributed across multiple processing devices or sub-systems that cooperate to execute the executable program 122 from the memory system 120. Non-limiting examples of the processing system include general purpose central processing units, application specific processors, and logic devices.

The memory system 120 may comprise any storage media readable by the processing system 110 and capable of storing the executable program 122 and/or data 124. Voltage thresholds such as those described above for comparing to a present voltage into the power system may be stored in the data 124. The memory system 120 may be implemented as a single storage device or be distributed across multiple storage devices or sub-systems that cooperate to store computer readable instructions, data structures, program modules, or other data. The memory system 120 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

FIG. 3 also shows other components that may be controlled by the control system 100, such as a steering actuator 140 and associated steering angle sensor 142, and a trim actuator 144 and trim angle sensor 146, each of which may be conventional and is thus not described further herein. The control system 100 also may also control the operation of other notification devices (e.g., display screens, speakers, buzzers, vibration devices), which may be in addition to or as an alternative to similar notification functionalities of the indicators 88, 90a-90c, and 92a-92c, an external device 70 (FIG. 1), and/or the display device 58.

In this manner, the presently discussed systems and methods provide for intuitive, simple, and automatic assistance in disabling power in a marine vessel and communicating the status thereof. This may be particularly advantageous in the context of a user that is not familiar with the marine vessel, such as a first responder, a renter, or a new boat owner. However, the benefits are nonetheless applicable to experienced operators as well, preventing accidents and improving awareness of the status of the system.

Figure 4:
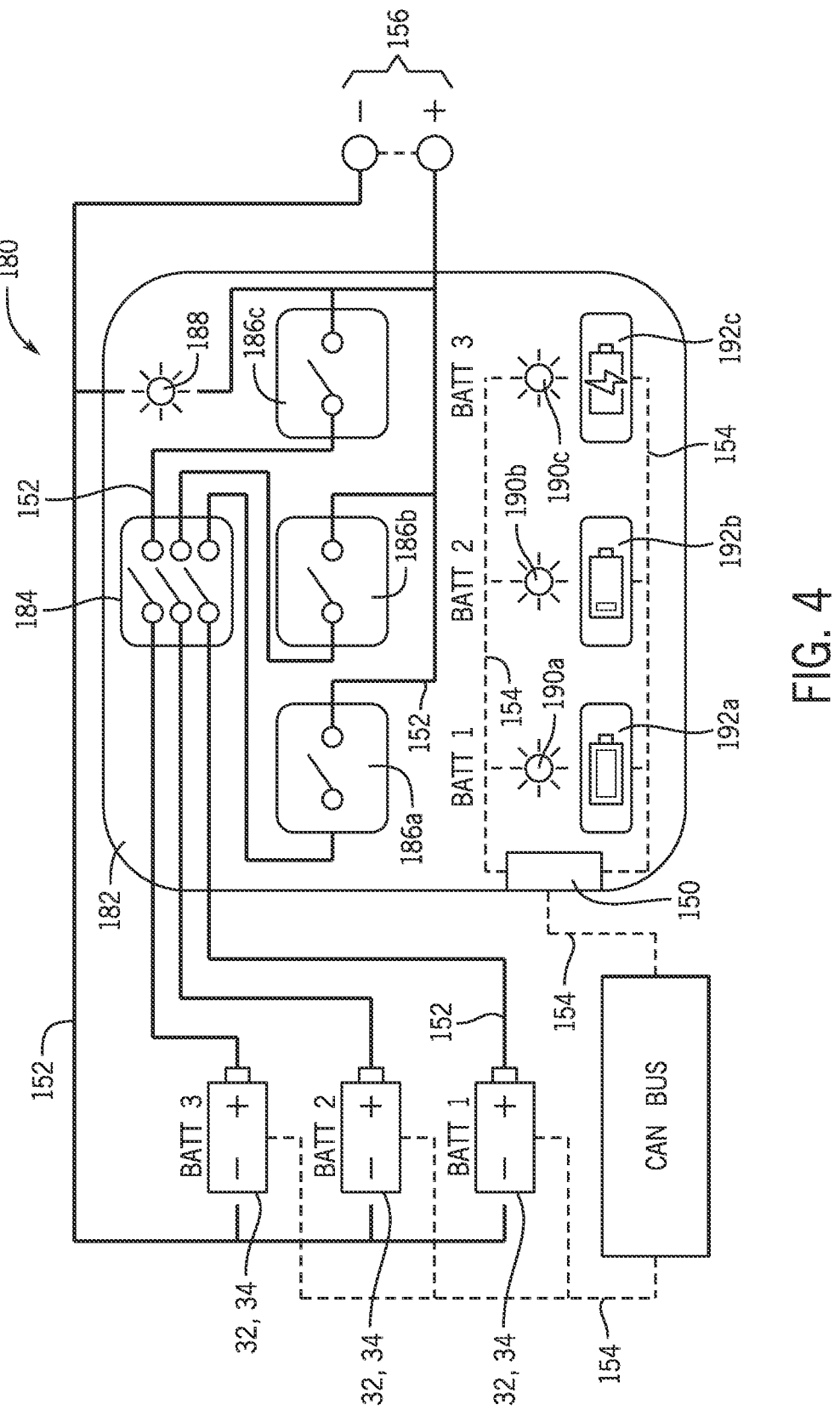
FIG. 4 is a schematic view of electrical couplings of components for one embodiment of a power panel assembly according to the present disclosure.
Figure 5:
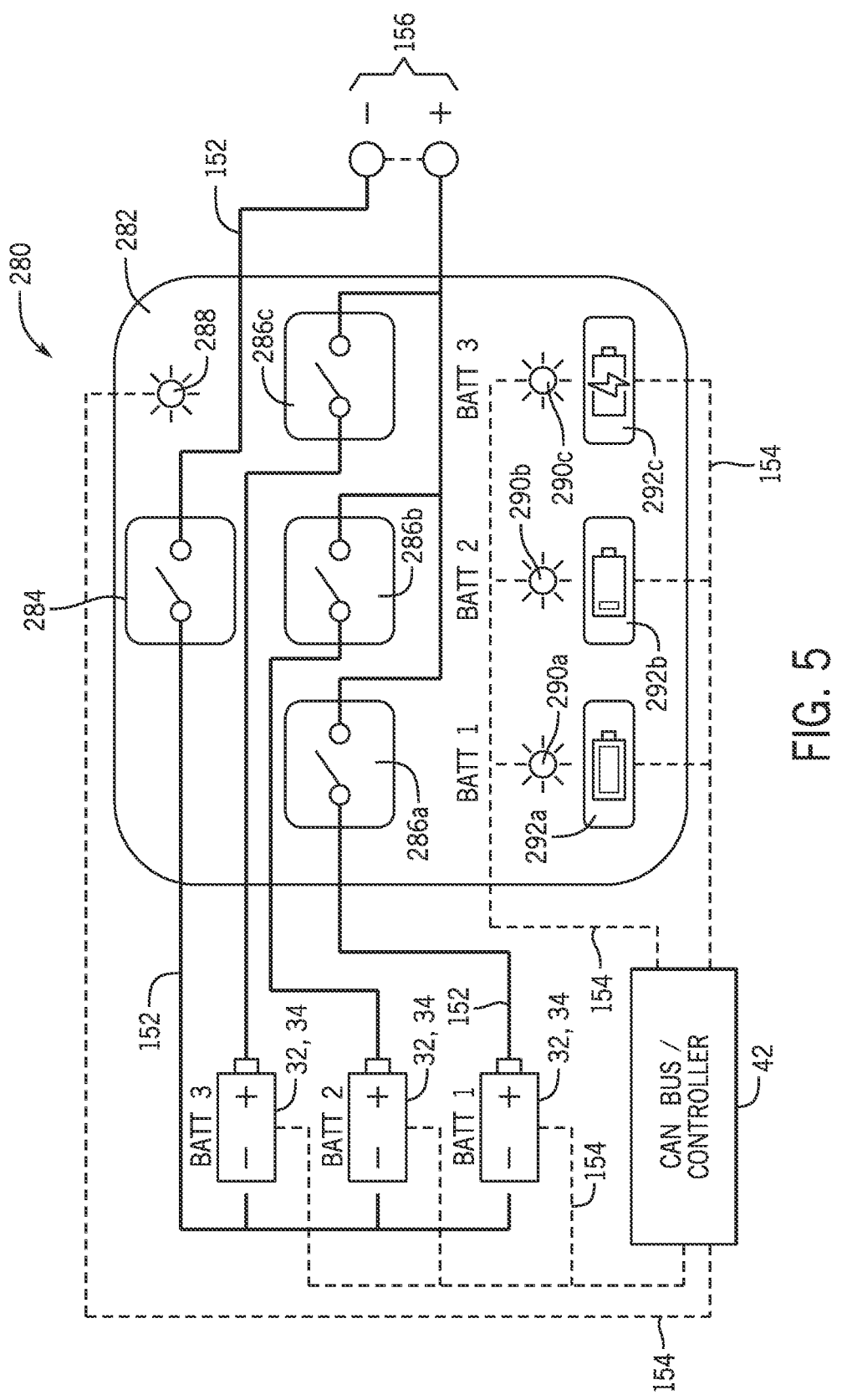
FIG. 5 is a schematic view of electrical couplings of components for another embodiment of a power panel assembly according to the present disclosure.
Figure 6:
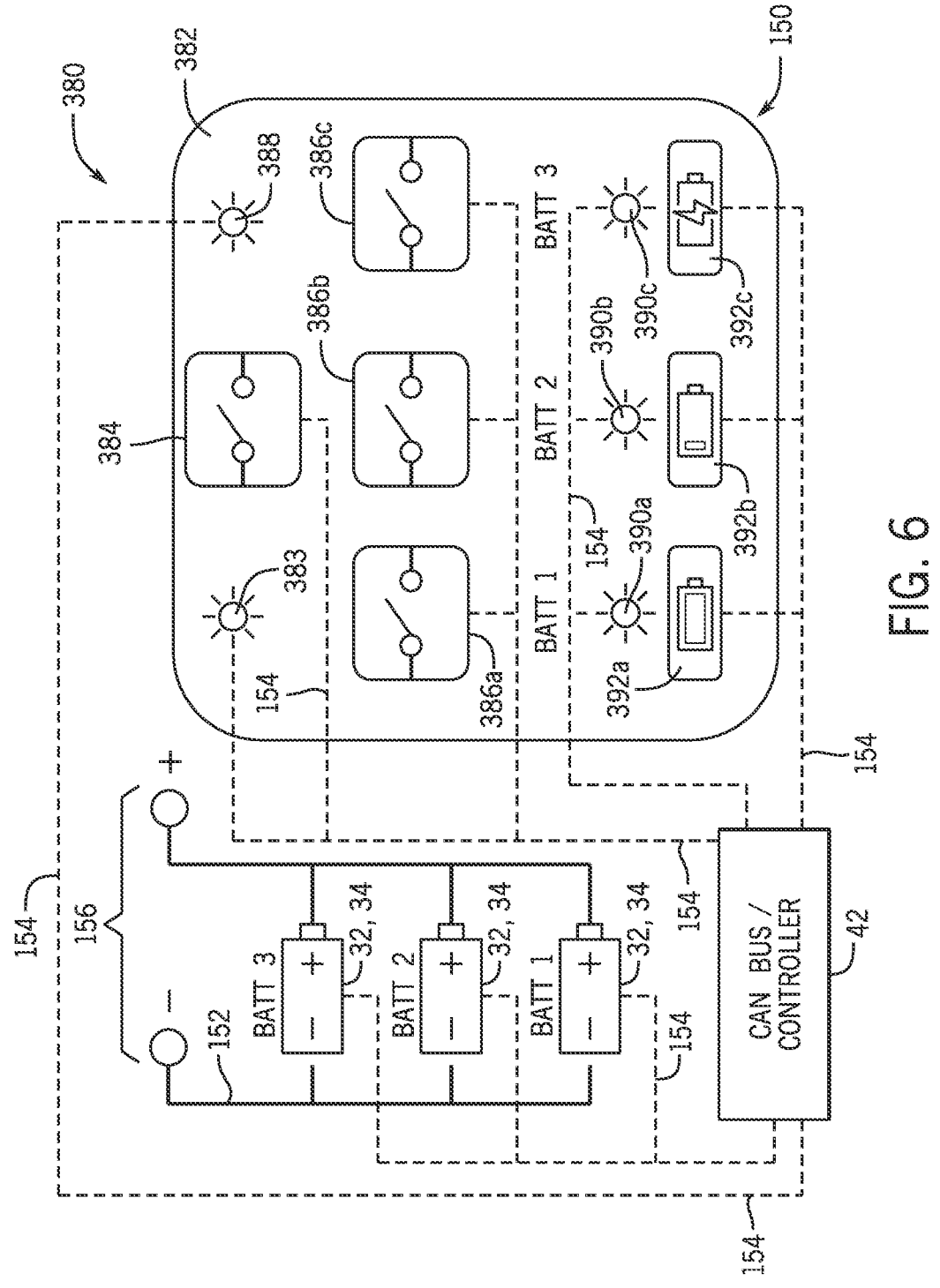
FIG. 6 is a schematic view of electrical couplings of components for another embodiment of a power panel assembly according to the present disclosure.

FIGS. 4-6 shows examples of different manners in which the components of the presently disclosed power panel assemblies may be electrically coupled to each other and/or to other devices in the marine vessel, such as the batteries 32, the load 156, and the like. As discussed above, the load 156 represents any device that is intended to be powered by the batteries or other power sources on the marine vessels, whereby the flow of energy therebetween is controlled via the power panel assembly 80. Thus, the load 156 includes marine drives, a GPS device, communication devices, lighting systems, and/or the like.

It should be recognized that the embodiments of FIGS. 4-6 are merely examples and further configurations for electrical coupling and/or physical layout are also contemplated. For brevity, the different embodiments generally share similar reference numbers to the power panel assembly 80 where the same components could be used, typically being incremented by 100 (e.g., switches 84 and 184 could be the same, but are not limited as such). In this manner, further discussion is primarily limited to the electrical coupling of components, whether for transmitting power and/or communication.

FIG. 4 shows a power panel assembly 180 is configured to providing switching primarily via discrete wiring, shown as power lines 152. In other words, the switches 184 and 186a-186c electrically connect the different batteries 32 to the load 156, such as in the manner described above. In the example shown, the switch 184 is a triple pole, single pole switch and the switches 186a-186c are single pole, single pole switches, which may be push button, toggle, rotary, or other types of switches known in the art. In the embodiment shown, the first battery 32, the second battery 32, and the third battery 32 are electrically coupled to provide power to the load 156 in parallel when all the switches 184 and 186a-186c are closed, as is also true of the embodiments of FIGS. 5 and 6. As discussed above, the present disclosure also contemplates power panel assemblies for marine vessels having differing numbers of batteries or other power sources, which would change the number of switches (e.g., eliminating the switch 186c for two batteries) and corresponding indicators. The batteries may also be arranged in a different manner, for example with parallel groups of batteries that are in series.

The indicator 188 is also electrically coupled to the batteries 32 via power lines 152 so as to be able to indicate the on/off state of the power system as a whole (e.g., whether power is provided by any battery) without the need for a CAN bus or other controller-based mechanism for communication. In certain examples, a charger is coupled to the batteries 32 such that the indicator 188 also indicates if the charger is connected and/or is providing power to the power system, even if all batteries are off. This may include a dedicated "charger connected" LED 383 (see FIGS. 6 and 7) or displaying a message such as "charger connected" or "charger plugged in", by way of example.

In the embodiment of FIG. 4, the batteries 32 each have a BMS 34 for communicating voltages, states or charge, the on/off status, and/or the charging status of the battery, as well as controlling whether the battery is on or off. The BMSs 34 communicate via communication lines 154 to a CAN bus, which may be a CAN bus already present in the marine vessel. As discussed further below in conjunction with the embodiment of FIG. 7, the communication lines 154 may also or alternatively be connected to the BMSs directly. The power panel assembly 180 includes a controller 150 that receives inputs relating to voltages, states or charge, the on/off status, and/or the charging status of the different batteries, which may be received directly from the BMSs 34 and/or from another controller (e.g., the controller 42 of FIG. 2). In this manner, the controller 150 may be combined with others so as to not be required within the power panel assembly 180. The controller 150 is electrically coupled via communication lines 154 to the indicators 190a-190c and 190c-192c, which as discussed above may be similar or the same as the indicators 90a-90c and 92a-92c discussed above (see FIG. 3). The controller 150 controls the indicator 190a based on whether the BMS 34 of the first battery 32 indicates that the battery is on, and controls the indicator 192a based on the state of charge for the first battery 32 as received from its BMS 34. In certain examples, the indicators 192a-192c also indicate whether the corresponding battery is being charged. In certain examples, the indicators 192a-192c are only controlled to be on when the corresponding battery is on.

In another embodiment, the power panel assembly varies from that shown in FIG. 4 in that the indicators 190a-190c are also electrically coupled via discrete wires or power lines 152. In this case, each indicator 190a-190c may be electrically coupled between the negative contacts of the batteries and the downstream sides of the switches 186a-186c so as to be on whenever the corresponding switch is closed, and without requiring a CAN bus or controllers for providing this notification.

FIG. 5 shows a power panel assembly 280 similar to that of FIG. 4, but with the indicator 288 being controlled via a communication line 154 rather than a power line 152 (FIG. 4). The indicator 288 may be controlled another controller separate from the power panel assembly 280, or the indicator 288 may be configured to directly receive the inputs from the BMSs 34 via the CAN bus (e.g., when the indicators are part of a touchscreen display having its own controller). In other examples, the power panel assembly 280 has a controller similar to that of the controller 150 in FIG. 4 and the communication lines 154 communicate therethrough. In certain configurations, the display has its own low voltage discrete power supply so that disabling all power sources does not also remove power from the display indicating this disabled status.

FIG. 6 shows a further power panel assembly 380, in this case where all switches and indicators are controlled via communications lines 154 based on inputs from the BMSs 34 or elsewhere in the control system (e.g., a controller 42, see FIG. 2). This configuration may be embodied in a touchscreen display having its own controller that functions similarly to the controller 150 of FIG. 4. This examples advantageously provides for simple wiring as no discrete wires are needed between the batteries 32 and the power panel assembly 380, nor between the power panel assembly 380 and the load 156.

Figure 7:
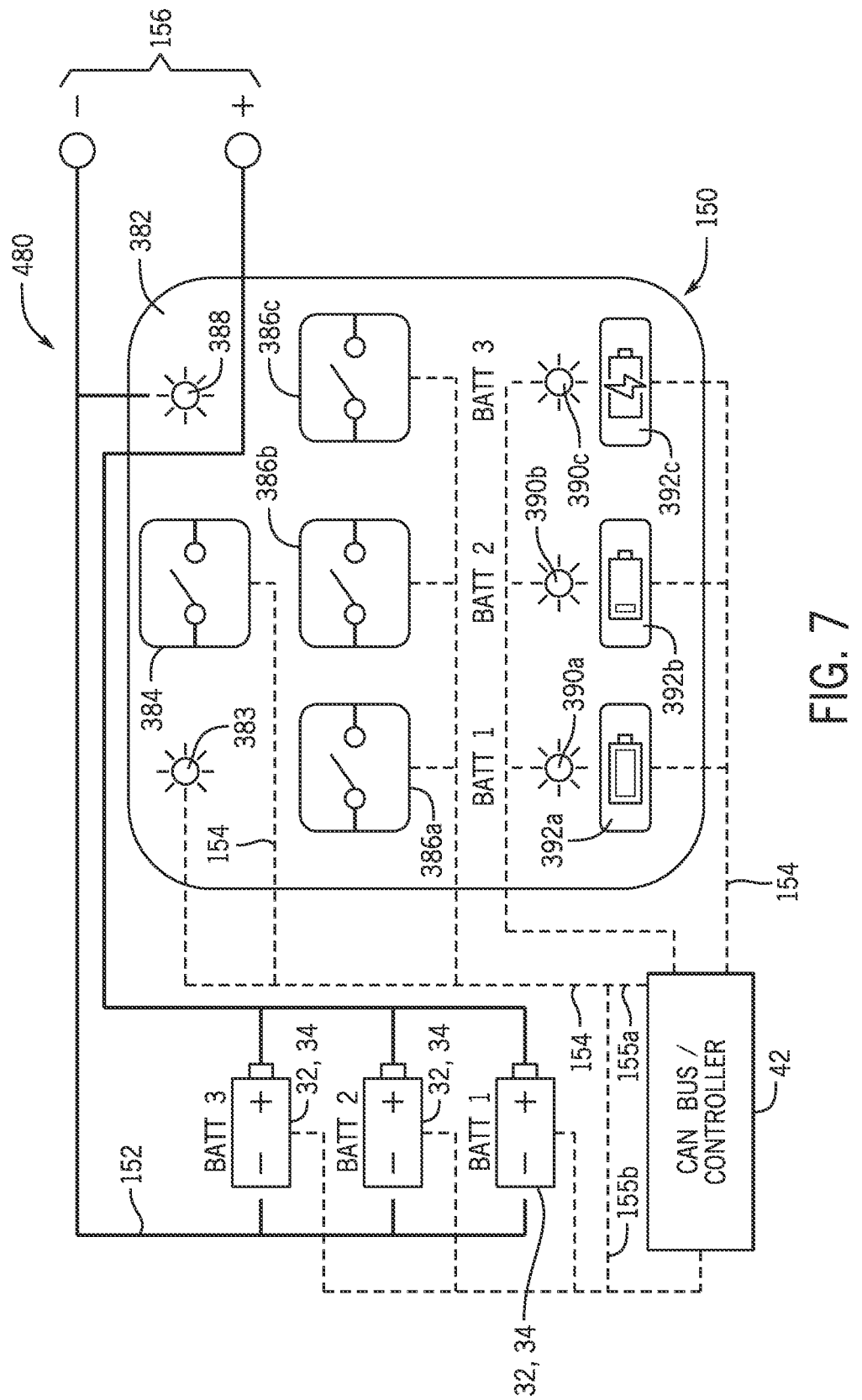
FIG. 7 is a schematic view of electrical couplings of components for another embodiment of a power panel assembly according to the present disclosure.

FIG. 7 depicts yet another embodiment of a power panel assembly 480, which shares similarities with those of FIGS. 4 and 6. One feature of the power panel assembly 480 is that the indicator light is based off the actual voltage of the battery bank, independent of the battery CAN bus. This advantageously provides a form of redundancy. Since the switches in this embodiment turn off the batteries via the CAN, the voltage indicator light 388 serves as a confirmation that the batteries really are off and thus that no hazardous voltage is present on the circuit (i.e., versus being a reflection of the CAN based battery switch state). This configuration and the configuration in FIG. 4 have the additional benefit of indicating voltage presence due to system capacitance. The present inventors have recognized that even when the batteries are off, there may be high voltage capacitors in the motor or elsewhere in the circuit that maintain the voltage for a time until bled down. This system therefore provides visibility for that voltage until bled down.

The present inventors have also identified additional advantages to the embodiments of FIGS. 6 and 7. In particular, these assemblies advantageously provide for switching off at the source of the battery. When a battery with a BMS is switched off, its positive and negative poles are disabled or otherwise electrically dead. In this manner, the entire circuit is disabled and thus safe to touch.

Other embodiments are also contemplated by the present disclosure. For example, the embodiment of FIG. 7 may be varied such that the indicators 390a, 390b, 390c are wired to be powered by the corresponding batteries, rather than being CAN-based. Additionally, the embodiment of FIG. 7 shows a configuration in which the switches 386a, 386b, and 386c provide communication via both analog and digital mechanisms, which may apply to other embodiments as well. In the example shown, the communication lines 154 from the switches 386a, 386b, and 386c are not only connected to the CAN bus 42, via line 155a, but also directly to the BMSes 34 of the batteries 32, via line 155b. In this configuration the switches 386a, 386b, and 386c communicate via analog signals directly to the BMSes 34 for controlling the power output of the batteries 32, which advantageously does not require powering the CAN Bus controller 42 to do so. Concurrently, the switches 386a, 386b, and 386c communicate digitally via the CAN bus for communicating the battery levels and/or charging states of the batteries 32. Thus, while the battery levels and charging states of the batteries 32 may be obtained from the BMSes 34 indirectly via the CAN bus controller 42, the configuration of FIG. 7 provides the further failsafe protection by bypassing the CAN bus controller 42 with respect to controlling the output of the batteries 32.

It should be recognized that the presently disclosure is not limited to systems and methods in which use of the external power connection precludes use of a battery switch, as there are still benefits to simply providing both on the same panel and/or in close proximity to each other. The present disclosure also contemplates other mechanisms for covers, including hinged or pivoting.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A power panel assembly for a marine vessel having a first battery, a second battery, and a load, the power panel assembly comprising:
    a panel configured to be positioned within the marine vessel;
    a first switch supported by the panel and operable to selectively turn off the first battery and the second battery together;
    a second switch supported by the panel and operable to selectively turn off the first battery independently of the second battery;
    a third switch supported by the panel and operable to selectively turn off the second battery independently of the first battery;
    an indicator supported by the panel and operatively coupled to be in a first state when the first battery is on and in a second state when the first battery is off to thereby notify an operator whether the first battery is on.

2. The power panel assembly according to claim 1, wherein the first battery and the second battery are electrically coupled to provide power to the load in parallel when the first switch, the second switch, and the third switch are each closed.

3. The power panel assembly according to claim 1, wherein the indicator is a light that is on in the first state and off in the second state.

4. The power panel assembly according to claim 1, wherein the indicator is a first indicator, further comprising a second indicator supported by the panel, the second indicator being operatively coupled to be in a first state when the second battery is on and in a second state when the second battery is off to thereby notify the operator whether the second battery is on.

5. The power panel assembly according to claim 4, further comprising a third indicator supported by the panel and operatively coupled to be in a first state when the first battery and/or of the second battery is on and in a second state when both the first battery and the second battery are off.

6. The power panel assembly according to claim 5, wherein the first battery and the second battery are power sources configured for powering to the load, further comprising a sensor configured to measure a voltage being provided for powering the load, wherein the third indicator is operatively coupled to be in the first state when any non-zero voltage is measured as being provided by the power sources.

7. The power panel assembly according to claim 1, wherein the indicator is a first indicator, further comprising a second indicator supported by the panel and operatively coupled to be in a first state when the first battery and/or of the second battery is on and in a second state when both the first battery and the second battery are off.

8. The power panel assembly according to claim 1, further comprising a controller configured to receive an input relating to whether the first battery is on, wherein the indicator is operatively coupled to be controlled by the controller based on the input.

9. The power panel assembly according to claim 8, wherein the controller is configured to receive the input via a CAN bus.

10. The power panel assembly according to claim 8, wherein the first battery has a battery management system (BMS) associated therewith, and wherein the controller is operatively coupled to the first switch and configured to control the BMS of the first battery based thereon.

11. The power panel assembly according to claim 8, wherein the indicator is a first indicator, further comprising a second indicator supported by the panel, the second indicator being configured to display a state of charge of the first battery.

12. The power panel assembly according to claim 11, wherein the first indicator and the second indicator are spaced apart from each other and are independently operable by the controller.

13. The power panel assembly according to claim 11, wherein the controller is configured to display the state of charge of the first battery when the first switch and/or the second switch is open.

14. The power panel assembly according to claim 11, wherein the controller is configured to determine whether the first battery is being charged and to cause the second indicator to indicate when the first battery is being charged.

15. The power panel assembly according to claim 8, further comprising a touchscreen device supported by the panel, wherein at least one of the first switch, the second switch, and the third switch is operated via the touchscreen device.

16. The power panel assembly according to claim 1, wherein
    the indicator is further operatively coupled to be in the first state when the second battery is on.

17. The power panel assembly according to claim 16, wherein the indicator is operable independently of the first switch, the second switch, and the third switch.

18. The power panel assembly according to claim 16, further comprising a controller configured to receive an input relating to whether the first battery is on, wherein the indicator is operatively coupled to be controlled by the controller based on the input.

19. The power panel assembly according to claim 1, further comprising:
    a second indicator supported by the panel and operatively coupled to be in a first state when the first battery is electrically connected to the load and in a second state when electrically disconnected from the load; and
    a third indicator supported by the panel and operatively coupled to be in a first state when the second battery is electrically connected to the load and in a second state when electrically disconnected from the load.

20. The power panel assembly according to claim 19, wherein at least one of the first switch, the second switch, and the third switch is electrically connected to the first battery and the second battery to control an energy flow therefrom without a CAN bus.

* * * * *